No. 844,005. PATENTED FEB. 12, 1907.
E. R. DRAVER.
MEANS FOR IMPARTING GYRATORY MOTION TO SIEVE BOXES AND OTHER BODIES.
APPLICATION FILED SEPT. 17, 1906.

4 SHEETS—SHEET 1.

Witnesses.
A. H. Opsahl.
H. O. Kilgore.

Inventor.
Emil R. Draver
By his Attorneys.
Williamson & Merchant

No. 844,005. PATENTED FEB. 12, 1907.
E. R. DRAVER.
MEANS FOR IMPARTING GYRATORY MOTION TO SIEVE BOXES AND OTHER BODIES.
APPLICATION FILED SEPT. 17, 1906.

4 SHEETS—SHEET 2.

Witnesses.
A. H. Opsahl.
H. D. Kilgore.

Inventor.
Emil R. Draver.
By his Attorneys.
Williamson Merchant

No. 844,005. PATENTED FEB. 12, 1907.
E. R. DRAVER.
MEANS FOR IMPARTING GYRATORY MOTION TO SIEVE BOXES AND OTHER BODIES.
APPLICATION FILED SEPT. 17, 1906.

4 SHEETS—SHEET 3.

Witnesses.
A. H. Opsahl.
N. D. Kilgore.

Inventor.
Emil. R. Draver.
By his Attorneys.
Williamson & Merchant

No. 844,005. PATENTED FEB. 12, 1907.
E. R. DRAVER.
MEANS FOR IMPARTING GYRATORY MOTION TO SIEVE BOXES AND OTHER BODIES.
APPLICATION FILED SEPT. 17, 1906.

4 SHEETS—SHEET 4.

Witnesses.
A. H. Opsahl.
H. D. Kilgore.

Inventor.
Emil R. Draver.
By his Attorneys.
Williamson Merchant

UNITED STATES PATENT OFFICE.

EMIL R. DRAVER, OF RICHMOND, INDIANA.

MEANS FOR IMPARTING GYRATORY MOTION TO SIEVE-BOXES AND OTHER BODIES.

No. 844,005.	Specification of Letters Patent.	Patented Feb. 12, 1907.

Application filed September 17, 1906. Serial No. 334,922.

*To all whom it may concern:*

Be it known that I, EMIL R. DRAVER, a citizen of the United States, residing at Richmond, in the county of Wayne and State of Indiana, have invented certain new and useful Improvements in Means for Imparting Gyratory Motion to Sieve-Boxes and other Bodies; and I do hereby declare the following to be a full, clear, and exact description of the invention, such as will enable others skilled in the art to which it appertains to make and use the same.

This invention has for its object to provide an improved means for imparting gyratory motion to sieve-boxes and other movable bodies; and to this end the invention consists of the novel devices and combinations of devices hereinafter described, and defined in the claims.

Heretofore sieve-boxes which have been freely suspended or supported have been given gyratory motions by means of rotating shafts having unbalanced or offset weights. Also it has been proposed to arrange these sieve-boxes in rigidly-connected diagonally-disposed pairs and to gyrate the same by a centrally-disposed crank-shaft; but in such proposed construction no means has been provided for positively holding the relatively movable sieve-boxes parallel with respect to each other.

My invention will be best understood by the illustration of the manner in which I connect and operate a pair of sieve-boxes for simultaneous movements in the opposite direction and at all times hold the same parallel. This arrangement is illustrated in the accompanying drawings, wherein like characters indicate like parts throughout the several views.

Figure 1:
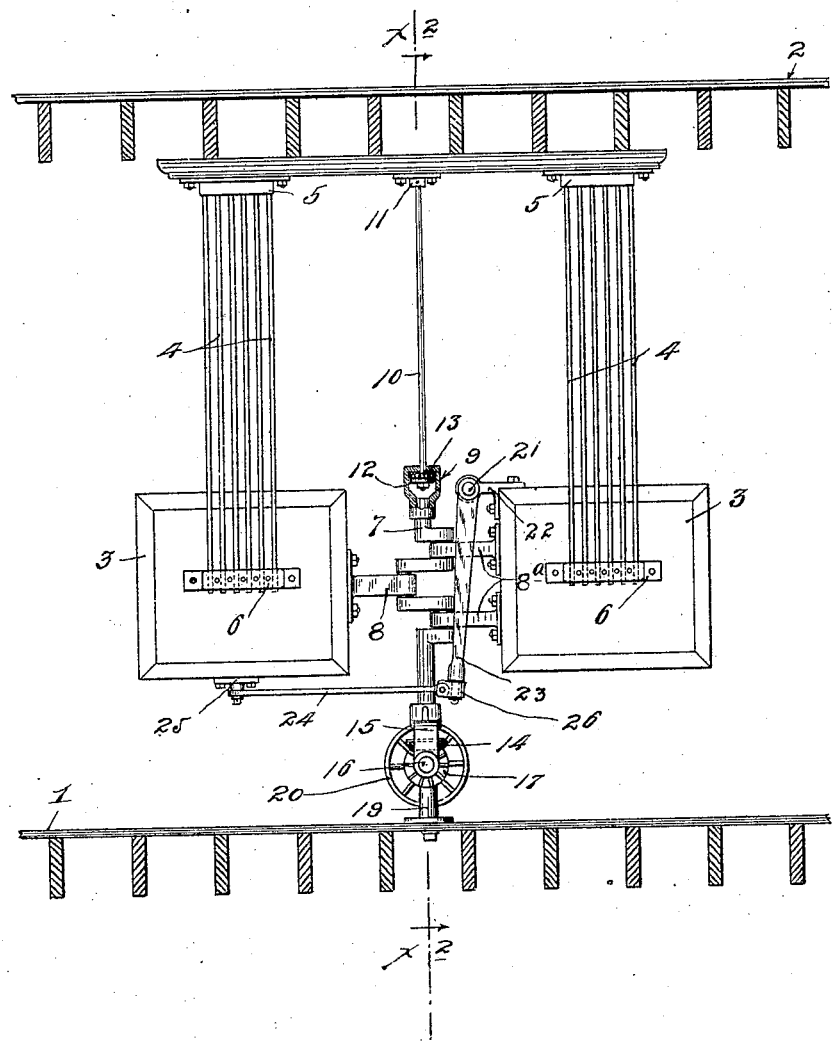
Figure 2:
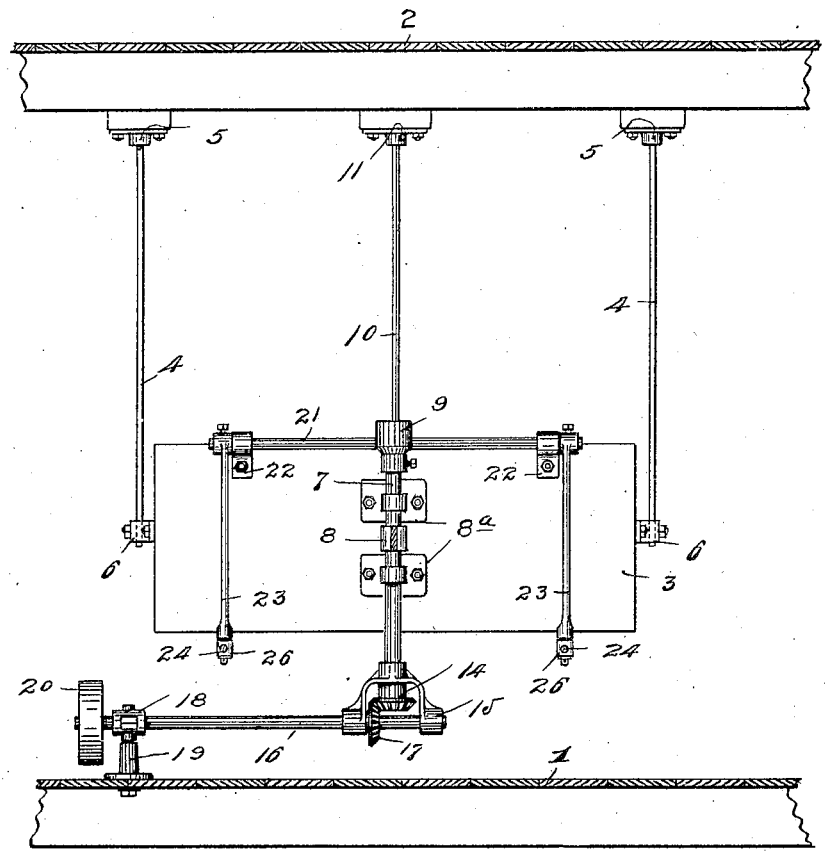
Figure 3:
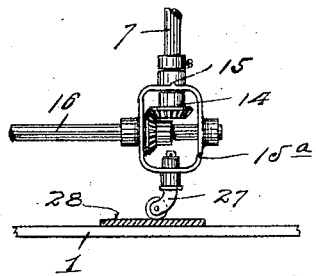
Figure 4:
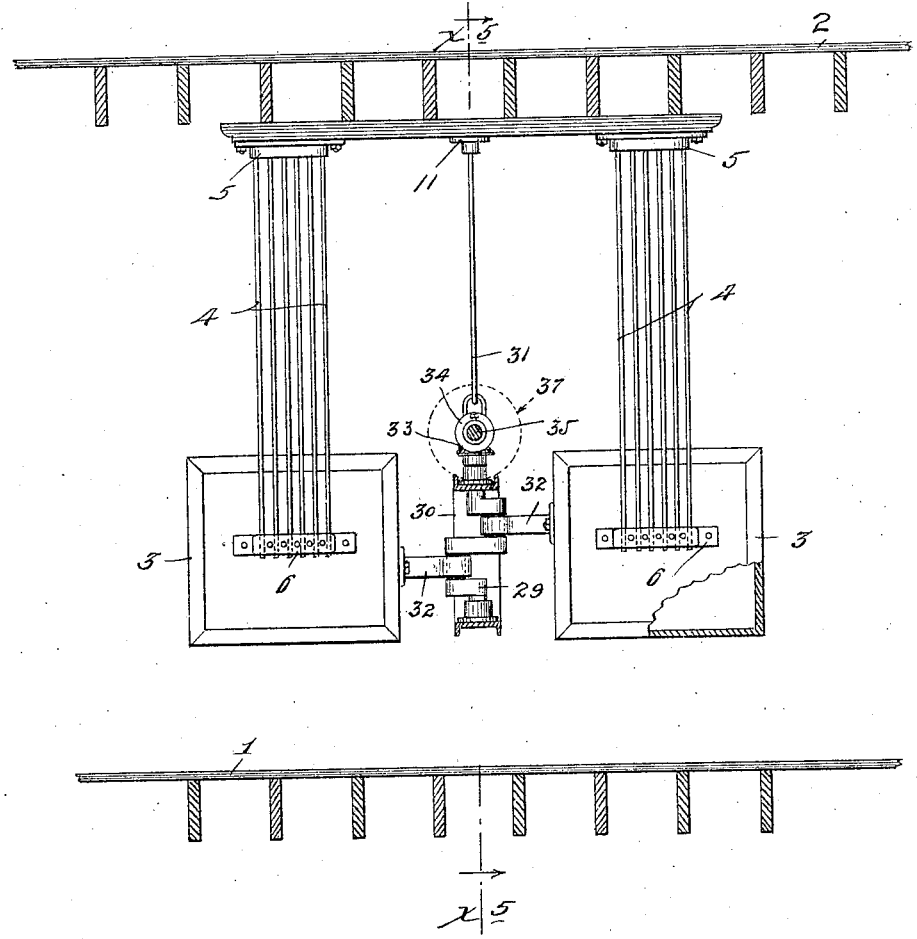
Figure 5:
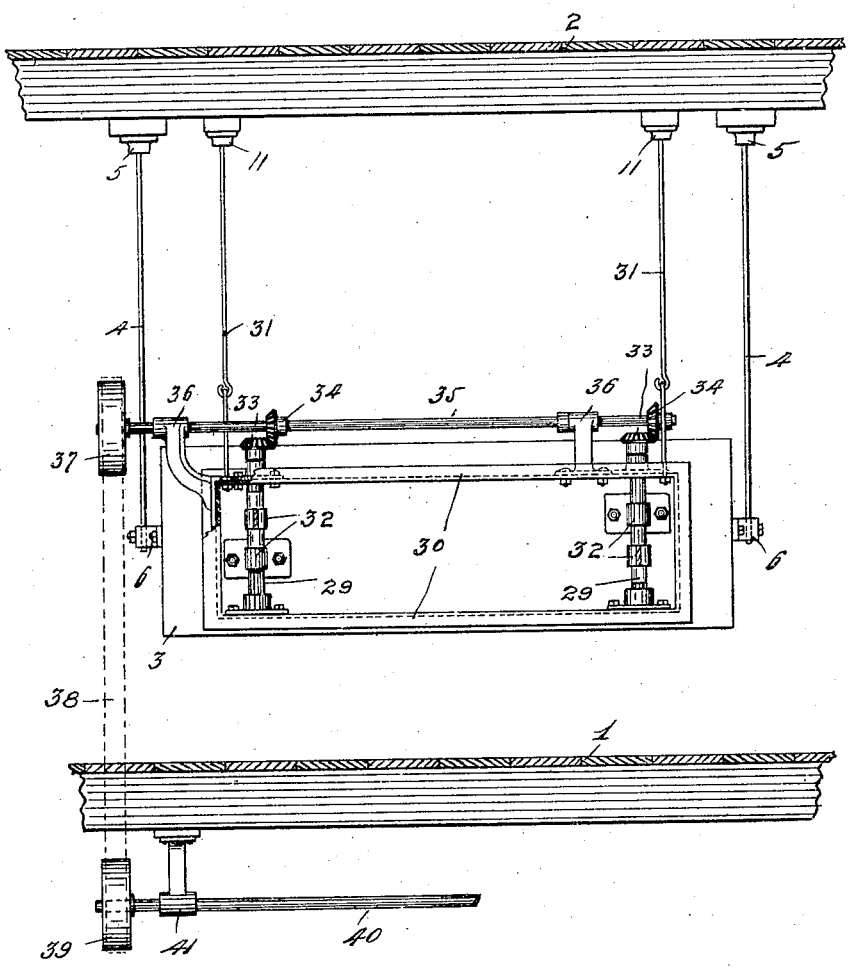

Referring to the drawings, Figure 1 is a view in end elevation illustrating my invention applied to a pair of sieve-boxes, some parts being sectioned. Fig. 2 is a vertical section taken approximately on the line $x^2 x^2$ of Fig. 1. Fig. 3 is a detail in elevation illustrating a modified construction for supporting the crank-shaft which produces the gyratory motions of the sieve-boxes shown in Figs. 1 and 2. Fig. 4 is a view corresponding to Fig. 1, but illustrating a modified construction of the means for gyrating the sieve-boxes and connecting the same for parallel movements; and Fig. 5 is a vertical section taken approximately on the line $x^5 x^5$ of Fig. 4, some parts being broken away.

The numerals 1 and 2 indicate, respectively, the lower and upper floor of a mill or other structure in which the sieve-boxes and connections thereto are installed.

The sieve-boxes, which are indicated by the numeral 3, are each suspended from the upper floor 2 by groups of resilient rods 4, the upper ends of which, as shown, are secured to the said upper floor by brackets 5 and the lower ends of which are secured to the ends of the said sieve-boxes by means of keeper-brackets 6. The two sieve-boxes are thus freely suspended at the same or approximately the same elevation and extend parallel the one with respect to the other.

Referring now to Figs. 1 and 2, the numeral 7 indicates a vertically-disposed crank-shaft, which is preferably formed with three cranks, the intermediate of which projects in one direction and the upper and lower of which project in the opposite direction. The intermediate crank of said shaft 7 is journaled in the projecting end of a bracket 8, rigidly secured to one of the sieve-boxes, and the other two cranks are journaled in the projecting ends of a pair of overlying brackets $8^a$, that are rigidly secured to the other sieve-box. At its upper end the crank 7 is provided with a hollow head 9, that constitutes one member of a swivel-joint and is adapted to serve as an oil-box. The numeral 10 indicates a non-rotary rod, the upper end of which, as shown, is rigidly secured to a keeper 11, rigidly secured to the upper floor 2. The lower end of this rod 10 projects axially into the hollow head 9 of the shaft 7 and is provided with a ball-engaging head 12, between which and the upper portion of the head 9 bearing-balls 13 are interposed. By this means the weight of the crank-shaft 7 is sustained independently of the sieve-boxes, and at the same time the said crank-shaft is free for gyratory or oscillatory movements. At its lower end the crank-shaft 7 carries a rigidly-secured bevel-gear 14, and loosely journaled on said crank-shaft and supported by the hub of said gear 14 is a yoke 15, in the prongs of which one end of a horizontal driving-shaft 16 is journaled. This driving-shaft 16 is provided with a bevel-gear 17, that meshes with the bevel-gear 14. The outer end of the driving-shaft 16 is mounted for rotary and for limited sliding movements in a bearing 18, which bearing is pivotally connected to a fixed bearing pedestal 19, shown as rigidly secured to the lower floor 1. At its extreme outer end the driving-shaft 16 is provided with a pulley 20, over which a power-driven belt (not shown) is adapted to run to impart rotary motion to said driving-shaft and from thence to the crank-shaft 7.

The means illustrated in connection with Figs. 1 and 2 for holding the sieve-boxes parallel, while permitting them to move in opposite directions—to wit, simultaneously toward and simultaneously from each other—includes a rock-shaft 21, mounted in suitable bearings 22 on one of the sieve-boxes and provided at or near its ends with depending arms 23, the ends of which are connected to the corresponding end portions of the other sieve-box by means of links 24. The links 24 at their outer ends are preferably pivotally connected to bearings 25 on the bottom of the said sieve-box 3 and at their inner ends are preferably pivotally connected to coupling-brackets 26, which in turn are pivoted to the lower ends of the arms 23. It is evident that so far as the rock-shaft, arm, and link connections between the two boxes just described are concerned the said two sieve-boxes are capable of endwise, lateral, or gyratory movements with respect to each other; but under all such movements it will be positively held parallel with respect to each other. The crank-shaft connections between the two boxes, however, restricts these movements of the two boxes to gyratory motion, and in coöperation with the said parallel motion devices will, when the said crank-shaft is rotated, cause the said two sieve-boxes to make gyratory movements and to alternately move parallel, but simultaneously toward each other and parallel, but simultaneously away from each other. It is of course evident that if the weight of the two sieve-boxes be equal the forces required to overcome the momentum and inertia of the two boxes in effecting their reverse gyratory motions will offset each other. In view of this fact it is not necessary to provide the crank-shaft with an unbalanced weight to offset the weight of the sieve box or boxes, and, furthermore, the machine when in action will cause but very slight, if any, vibration to the building in which it is installed. In starting the machine into action and before the sieve-boxes have acquired the proper speed of gyration the crank-shaft 7 will gyrate or vibrate slightly, and hence the necessity with the particular construction described of mounting the driving-shaft 16 with freedom for both endwise and lateral pivotal motion.

With the construction illustrated in Figs. 1 and 2 the vertical disposition of the cranks of the crank-shaft 7 and of the crank-engaging bearing-brackets 8 and 8ª assists in holding the sieve-boxes plumb or in true vertical positions.

Fig. 3 illustrates the manner in which the crank-shaft 7 may be supported by a device located at its lower end. In this construction the yoke 15 is provided with a depending yoke portion 15ª, in which is swiveled a caster-wheel 27, that works on a face-plate 28, secured on the lower floor 1.

In the construction illustrated in Figs. 4 and 5 a pair of laterally-spaced upright crank-shafts 29 are journaled in a floating frame 30, preferably in the form of a rectangular yoke. This frame may be supported by any suitable means, but as shown is supported at its end portions from the upper floor 2 by means of jointed rods or links 31. Each crank-shaft 29 has two cranks, which cranks are oppositely disposed and are pivoted to the outer ends of bearings 32, rigidly secured to the inner sides of the boxes 3 near their end portions. The crank-engaging bearing 2 which is at one end of the box is higher up than the corresponding bearing member which is at the other end of the box. Otherwise stated, the upper crank of one of the crank-shafts is connected to one of the boxes and the lower crank of the other crank-shaft is connected to that same box. This arrangement of cranks and bearings holds the boxes plumb or in vertical positions. The two cranks which are connected to the same box are of course offset in the same direction from the axis of the crank-shaft, so that under rotary movements of the two crank-shafts the two boxes will be given gyratory motion simultaneously toward each other and simultaneously from each other. At their upper ends the crank-shafts 29 are provided with bevel-gears 33, that mesh with bevel-gears 34 of a counter-shaft 35, which counter-shaft is mounted in suitable bearings 36 on the floating frame 30 and is provided at its outer end with a pulley 37. Motion is imparted to the counter-shaft 35 by a belt 38, which runs over the pulley 37 and over a pulley 39 of a power-driven counter-shaft 40, which latter is mounted in suitable bearings 41, shown as secured below the lower floor 1. In this latter-described construction (illustrated in Figs. 4 and 5) it will be noted that the arrangement of the cranks and connections to the sieve-boxes is such that the cranks themselves, while imparting gyratory motion to the sieve-boxes, hold the same always parallel to each other. With this construction also the momentum and inertia of the two sieve-boxes under gyratory motion offset or neutralize each other. The belt 38 is of course sufficiently yielding to permit limited oscillatory or vibratory movements of the frame 30 when the machine is started into action.

The statement that the boxes or bodies which receive gyratory motion are held parallel to each other simply means that the said boxes are primarily set with their bodies suspended in predetermined directions with respect to each other and that that relation is maintained throughout the gyratory movements of the boxes. The said boxes or bodies, so-called "sieve-boxes," for convenience throughout the specification and claims, may of course take various forms, and it is not necessary that the same be in all cases true rectangular form.

What I claim is—

1. The combination with freely-suspended sieve boxes or bodies, of means connecting said boxes and positively holding the same parallel to each other, but permitting the said boxes or bodies to move toward and from each other and each to make its own gyratory motion, inertia of the one box offsetting that of the other, and means for imparting reverse gyratory movements to said boxes or bodies, involving a freely-suspended power-driven crank-shaft connected to said boxes or bodies, substantially as described.

2. The combination with a pair of freely-suspended sieve boxes or bodies, and means for imparting reverse gyratory movements thereto, of means for holding said boxes parallel while permitting their reverse gyratory movements, comprising a rock-shaft mounted on one of said boxes and provided with parallel arms, and links connecting said arms to the other boxes, substantially as described.

3. The combination with a pair of freely-suspended sieve boxes or bodies, of a rock-shaft mounted on one of said boxes and provided with parallel arms, links connecting said arms to the other box, and a freely-suspended power-driven crank-shaft having reversely-extended cranks connected to said two boxes, substantially as described.

4. The combination with a pair of freely-suspended sieve boxes or bodies, of a rock-shaft mounted on one of said boxes and provided with parallel arms, links connecting said arms to the two boxes, a freely-suspended crank-shaft located between said boxes and provided with reversely-projecting cranks connected to said two boxes, a power-driven counter-shaft mounted for freedom for limited endwise and oscillatory movements in a substantially horizontal plane, and gears connecting said counter-shaft to said crank-shaft, substantially as described.

In testimony whereof I affix my signature in presence of two witnesses.

EMIL R. DRAVER.

Witnesses:
   EVERETT R. LEMON,
   F. N. DRAVER.